United States Patent
Baccouche et al.

(10) Patent No.: US 7,887,122 B2
(45) Date of Patent: Feb. 15, 2011

(54) ONE-PIECE SHOTGUN WITH IMPACT ENERGY ABSORBER

(75) Inventors: Mohamed Ridha Baccouche, Ann Arbor, MI (US); Michael Musa Azzouz, Livonia, MI (US); Timothy Alan Mouch, Troy, MI (US); Bruno Barthelemy, Ann Arbor, MI (US); Paul Brandon Russette, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 12/137,642

(22) Filed: Jun. 12, 2008

(65) Prior Publication Data

US 2009/0315365 A1 Dec. 24, 2009

(51) Int. Cl.
B60J 7/00 (2006.01)
(52) U.S. Cl. .................................. 296/187.09
(58) Field of Classification Search ............ 296/187.09, 296/187.03, 193.09, 193.11, 198
See application file for complete search history.

(56) References Cited

U.S. PATENT DOCUMENTS

| | | | | |
|---|---|---|---|---|
| 4,288,025 A * | 9/1981 | Reidelbach et al. | ......... | 148/534 |
| 4,355,844 A * | 10/1982 | Fantini Muzzarelli | ....... | 296/205 |
| 4,726,166 A * | 2/1988 | DeRees | ........................ | 52/694 |
| 5,031,958 A | 7/1991 | Fujita et al. | | |
| 5,048,345 A * | 9/1991 | Hagiwara et al. | ............. | 73/788 |
| 5,118,160 A * | 6/1992 | Kitagawa et al. | ........ | 296/187.03 |
| 5,431,445 A * | 7/1995 | Wheatley | ..................... | 280/784 |
| 5,549,352 A * | 8/1996 | Janotik et al. | ................ | 296/209 |
| 5,853,195 A * | 12/1998 | Le et al. | ...................... | 280/784 |
| 5,876,078 A * | 3/1999 | Miskech et al. | ............. | 293/133 |
| 6,003,934 A * | 12/1999 | Usui | ...................... | 296/203.02 |
| 6,055,788 A * | 5/2000 | Martin et al. | ................ | 296/204 |
| 6,139,093 A | 10/2000 | Elliott et al. | | |
| 6,183,013 B1 * | 2/2001 | Mackenzie et al. | .......... | 280/797 |
| 6,203,098 B1 * | 3/2001 | Motozawa et al. | ..... | 296/187.09 |
| 6,299,240 B1 | 10/2001 | Schroeder et al. | | |
| 6,412,857 B2 | 7/2002 | Jaekel et al. | | |
| 6,447,052 B2 * | 9/2002 | Saeki | ..................... | 296/187.09 |
| 6,533,348 B1 | 3/2003 | Jaekel et al. | | |
| 6,695,393 B1 | 2/2004 | Aouadi et al. | | |
| 6,983,982 B2 | 1/2006 | Saeki | | |
| 7,185,945 B2 * | 3/2007 | Dandekar et al. | ...... | 296/187.09 |
| 7,210,732 B2 * | 5/2007 | Marijnissen et al. | ........ | 296/198 |
| 7,267,394 B1 * | 9/2007 | Mouch et al. | .......... | 296/203.02 |
| 7,275,785 B2 | 10/2007 | Caliskan et al. | | |
| 7,341,299 B1 * | 3/2008 | Baccouche et al. | ............ | 296/30 |
| 7,347,491 B2 * | 3/2008 | Mouch et al. | ............... | 296/209 |
| 7,651,133 B2 * | 1/2010 | Branning et al. | ............ | 280/785 |
| 7,677,617 B2 * | 3/2010 | Stewart et al. | ............... | 293/133 |
| 7,677,649 B2 * | 3/2010 | Hedderly | ................ | 296/193.07 |
| 7,703,841 B2 * | 4/2010 | Hedderly | ................ | 296/193.04 |

(Continued)

Primary Examiner—Kiran B. Patel
(74) Attorney, Agent, or Firm—O'Brien Jones, PLLC

(57) ABSTRACT

A one-piece shotgun is configured to absorb impact energy when a front of the vehicle is impacted. The shotgun comprises an upper portion, a mid portion, and a lower portion, the upper portion having an end configured to connect to a hinge pillar; and a Z-trigger formed by two indentations and being located adjacent the upper portion end. The indentations of the Z-trigger are located on an outer side and an inner side of the shotgun to cause substantially lateral bending when sufficient force is applied to the shotgun.

8 Claims, 4 Drawing Sheets

U.S. PATENT DOCUMENTS

2002/0162224 A1* 11/2002 Gabbianelli et al. ........ 29/897.2
2005/0057076 A1* 3/2005 Roux et al. ................. 296/198
2006/0131931 A1* 6/2006 Marijnissen et al. ........ 296/198
2007/0029840 A1* 2/2007 Marijnissen et al. ... 296/187.03
2010/0102592 A1* 4/2010 Tyan et al. ............. 296/187.09

* cited by examiner

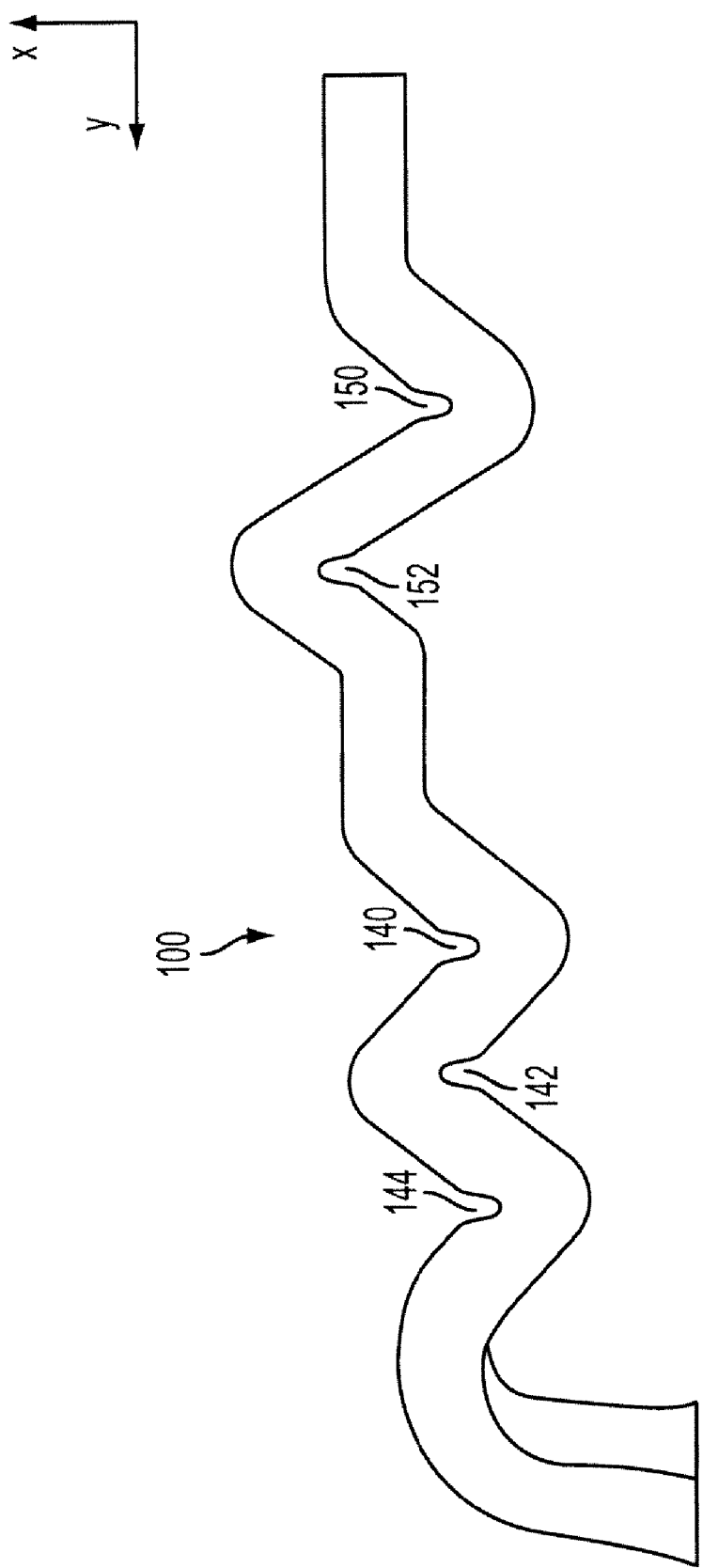

ONE-PIECE SHOTGUN WITH IMPACT ENERGY ABSORBER

FIELD OF THE INVENTION

The present teachings relate generally to a device and method for absorbing impact energy in a vehicle frame. The present teachings relate more specifically to a vehicle frame including a one-piece shotgun having a Z-trigger for absorbing impact energy.

BACKGROUND OF THE INVENTION

Automotive manufacturers continuously develop devices intended to improve vehicle safety. Moreover, automotive manufacturers are particularly concerned with intrusion into the passenger compartment, which can increase the risk of serious injury to vehicle occupants.

It is well known that deformation of an automotive structure can absorb some kinetic energy from an impact. Accordingly, kinetic energy from an impact can be used to bend the automotive structure instead of causing intrusion into the passenger compartment. As a result, the associated risk of vehicle occupant injury can be decreased.

Existing vehicle frames include structures that promote bending for impact energy management, for example via deformations that weaken the frame structure to promote bending at the location of the deformation. These frames, however, do not promote bending of a shotgun frame element in a region adjacent to the hinge pillar upon front impact. The result of not promoting controlled bending in this area is that bending occurs in an uncontrolled manner. This can result in downward bending of the shotgun in an area adjacent the hinge pillar, which can be combined with downward bending of the backup structure at the hinge pillar, leading to undesirable vehicle pitch during front impacts.

SUMMARY OF THE INVENTION

In accordance with certain embodiments of the present teachings, the present teachings provide a one-piece shotgun configured to absorb impact energy when a front of the vehicle is impacted. The shotgun comprises an upper portion, a mid portion, and a lower portion, the upper portion having an end configured to connect to a hinge pillar; and a Z-trigger formed by two indentations and being located adjacent the upper portion end. The indentations of the Z-trigger are located on an outer side and an inner side of the shotgun to cause substantially lateral bending when sufficient force is applied to the shotgun.

In accordance with certain embodiments of the present teachings, the present teachings also provide a method for reducing pitch of a front portion of a vehicle upon front impact of the vehicle. The method comprises using a Z-trigger located in an upper portion of a shotgun of the vehicle to cause substantially lateral bending of the shotgun when sufficient force is applied to the shotgun during a front impact.

Certain embodiments of the present teachings also provide a one-piece shotgun configured to absorb impact energy when a front of the vehicle is impacted. The shotgun has an upper portion with a rear end configured to connect to a hinge pillar. The shotgun comprises a front crash zone comprising at least a first weakened area and a second weakened area on an upper portion of the shotgun, the second weakened area being located closer to the rear end of the shotgun than the first weakened area; and a Z-trigger comprising a third weakened area and a fourth weakened area on an upper portion of the shotgun, the fourth weakened area being located closer to the rear end of the shotgun than the third weakened area. Sequential, substantially lateral bending of the shotgun during a front impact occurs such that the first weakened area bends before the second weakened area, the second weakened area bends before the third weakened area, and the third weakened area bends before the fourth weakened area.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain certain principles of the teachings.

BRIEF DESCRIPTION OF THE DRAWINGS

At least some features and advantages will be apparent from the following detailed description of exemplary embodiments consistent therewith, which description should be considered with reference to the accompanying drawings, wherein:

FIG. 4 illustrates a shotgun in accordance with certain exemplary embodiments of the present teachings as deformed after a front impact.

Figure 1:
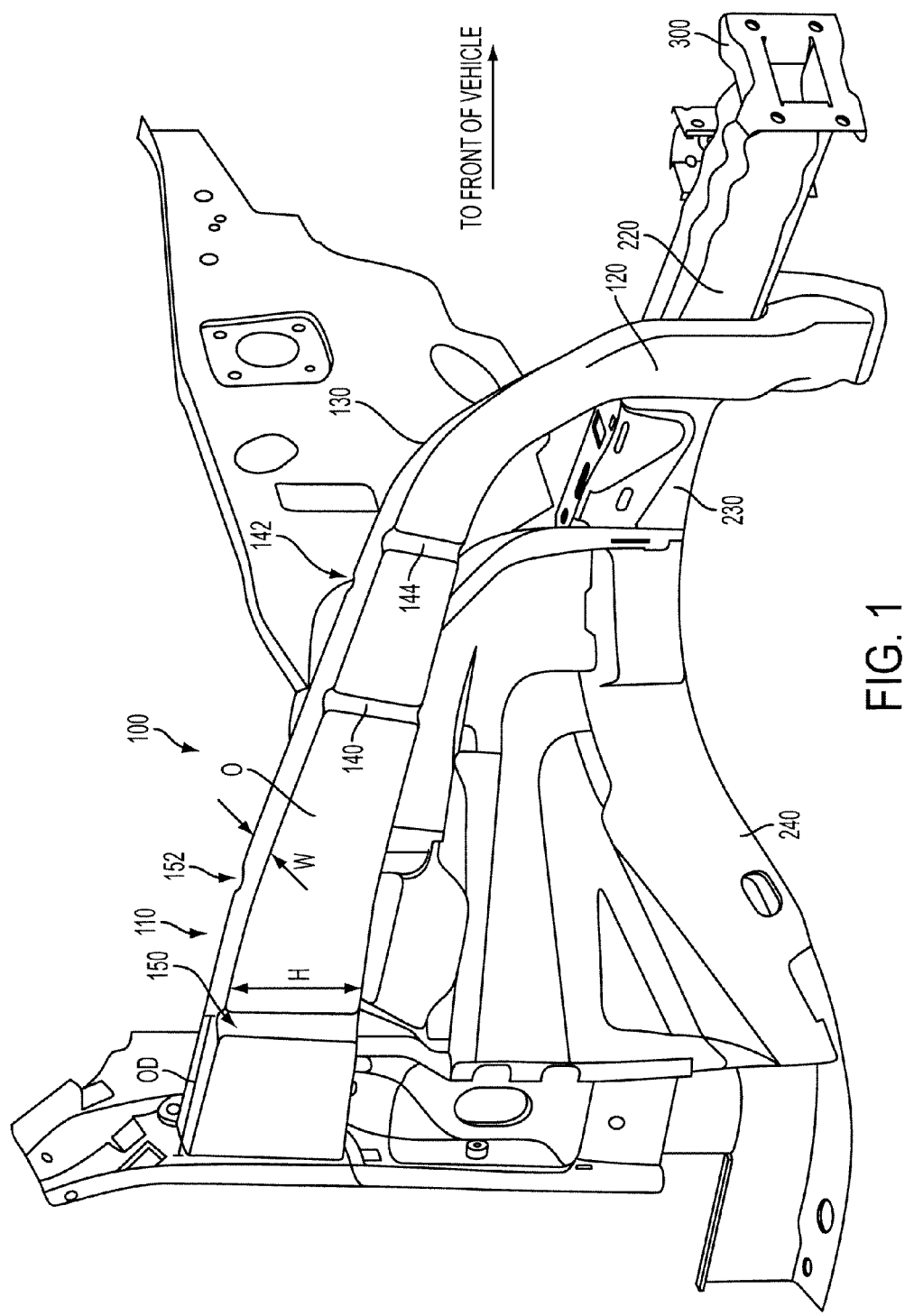
FIG. 1 illustrates a perspective view of portion of a vehicle structure including a shotgun in accordance with certain exemplary embodiments of the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a one-piece shotgun extending, for example, from a vehicle's hinge pillar or A-pillar to its subframe. During a front impact, the shotgun serves to transfer impact load from a vehicle's subframe to upper frame portions (e.g., the A-pillar, windshield header, roof side rails, door beams, and rocker members). Providing a one-piece shotgun, particularly when the one-piece structure extends down to the subframe so that an extension arm (or apron) is not needed, consolidates parts and can provide point mobility load transfer to the upper structure of the frame. Providing deformation(s) such as a Z-trigger in the shotgun can trigger the shotgun to bend substantially laterally at the site of the Z-trigger around a vertical Z-axis of the vehicle in a two-hinged Z-configuration bending mode. Substantially lateral bending, as used herein, includes bending that mitigates vehicle pitch by maintaining shotgun stiffness around a (transverse) Y-axis of the vehicle.

Placement of the deformation(s) in an upper portion of the shotgun adjacent the junction of the shotgun and the vehicle hinge pillar can improve crash energy management of the shotgun at the hinge pillar via double plastic hinging of the shotgun around the vehicle's vertical Z-axis. Placement of the deformation(s) adjacent the hinge pillar or A pillar can be advantageous because the upper frame structure (or greenhouse) that includes the hinge pillar and A pillar is relatively strong and remains static and should not deform during a front impact.

Promoting substantially lateral bending of the shotgun rather than vertical bending can lower undesirable vehicle pitch upon front impact, while also preventing dash intrusion. A shotgun, in accordance with certain embodiments of the present teachings, preferably meets static bending, static torsion, and durability requirements while still absorbing impact energy.

Hydroforming a one-piece shotgun that extends from the hinge pillar to the vehicle subframe can achieve a weight savings; for example a weight savings of from about 4.1 lbs to about 7.6 lbs can be achieved over existing stamped multi-piece shotgun designs. Hydroforming can enable manufacturers to better control frame stiffness, dimensional stability, fatigue life, and crashworthiness while reducing frame mass and cost. Hydroforming is a metal forming process in which high pressure fluid is used to outwardly expand a tubular blank to conform to surfaces of a die cavity of a die assembly to form an irregularly-shaped tubular part. Hydroformed members can be provided with a wider range of geometries in comparison with stamped or roll formed parts. Exemplary metals that can be hydroformed for automotive frames include, for example, steel and aluminum.

Because each hydroformed frame member can have a cross-sectional configuration that varies continuously along its length, a single hydroformed part can often replace a plurality of stamped (or roll formed) and welded parts, thereby reducing the number of parts necessary to complete frame construction. Consequently, vehicle weight and assembly cost can be reduced.

Hydroformed parts can also have a higher strength than stamped parts, primarily due to the plastic deformation of the blank wall during the hydroforming process. The outward expansion of the blank wall during hydroforming caused by the fluid pressure creates a work-hardening effect which uniformly hardens the metal material of the blank. Hydroforming can also produce less waste metal material than stamping or other known processes.

The present teachings also contemplate one-piece shotguns that are formed other than by hydroforming, for example by stamping. For hydroformed shotguns, deformations such as Z-trigger indentations (as illustrated in Figures) can be formed into the shotgun. For stamped shotguns, deformations such as Z-trigger indentations can be formed by stamping.

The present teachings contemplate a variety of mechanisms, other than indentations, that facilitate bending (for impact energy absorption) of the shotgun due to weakening of the shotgun structure, including, for example, holes, beads, darts, scoring, or even a varied height H of the shotgun. Many of the weakening structures can be hydroformed directly into/onto the shotgun. A sequence of bending of the shotgun can be controlled, for example, by varying the dimensions of the holes, beads, darts, or scoring of the shotgun, and/or by varying the height H of the shotgun. It can be desirable to control the sequence of bending of the shotgun upon impact. An exemplary sequence of bending is described below for certain embodiments of the present teachings represented in FIGS. 1-4.

Figure 2:
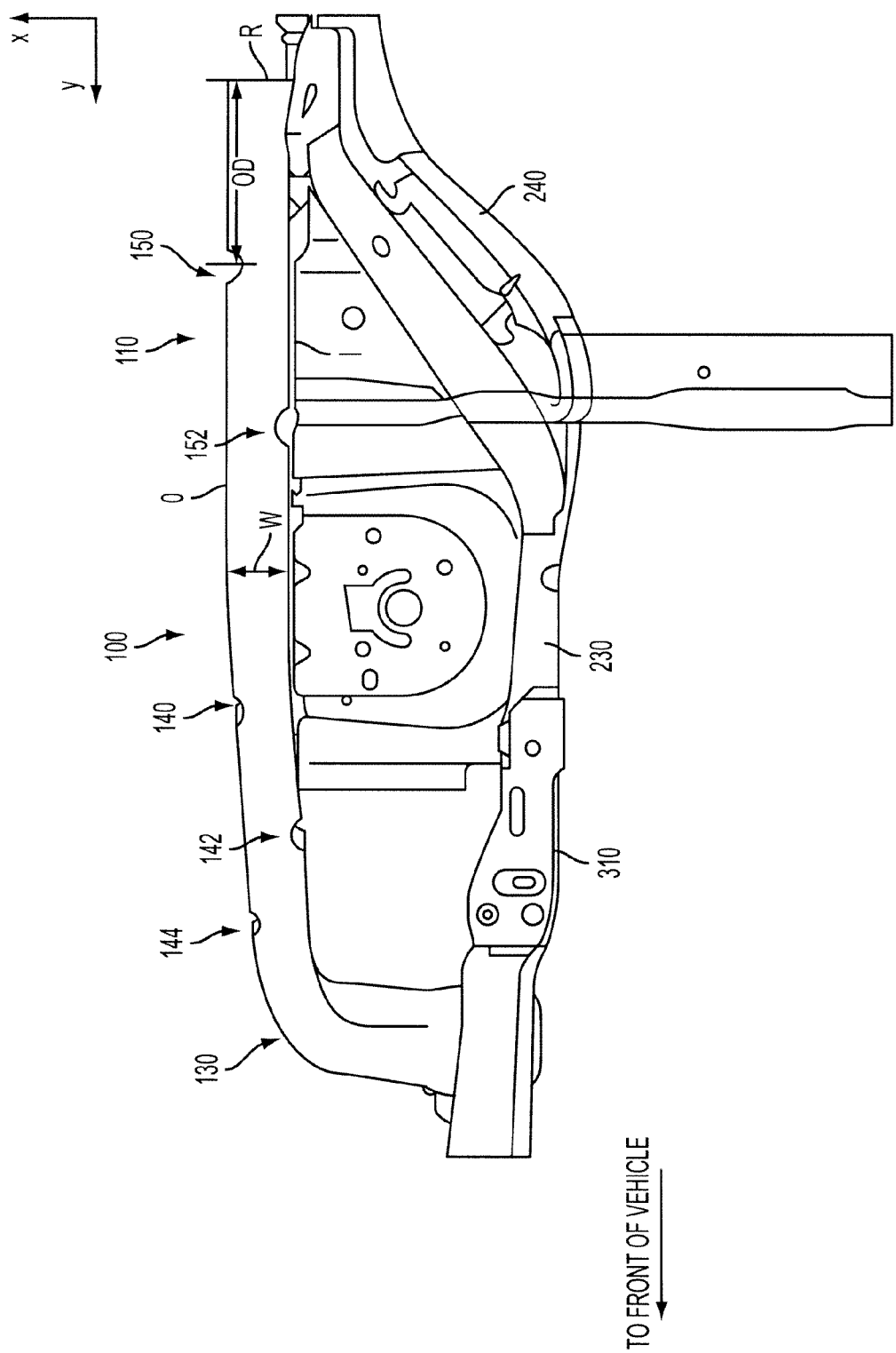
FIG. 2 illustrates a top view of the vehicle structure illustrated in FIG. 1.
Figure 3:
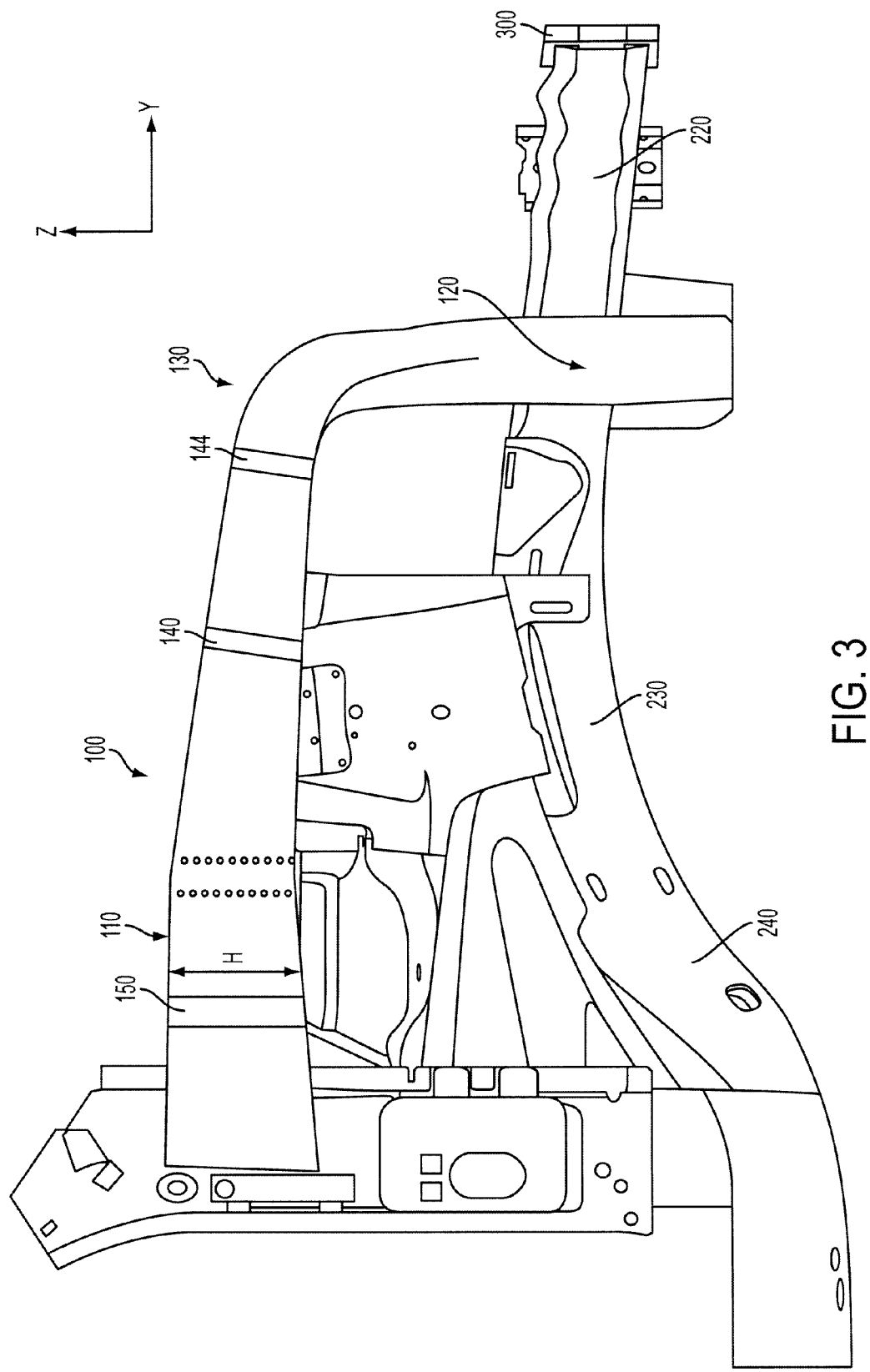
FIG. 3 illustrates a side view of the vehicle structure illustrated in FIG. 1.

FIGS. 1-3 illustrate perspective, top, and side views, respectively, of portions of a vehicle structure including a shotgun in accordance with certain exemplary embodiments of the present teachings. As can be seen, a shotgun 100 includes an upper portion 110 adjacent the vehicle hinge pillar 200 and A pillar 210, a central, bending portion 130 where it angles downward toward the vehicle subframe, and a lower portion 120 that connects to the vehicle subframe. Thus, the shotgun 100 connects the vehicle subframe (not shown) to its upper structure, the upper structure comprising the illustrated A pillar 210 and other vehicle frame structure (not shown) such as the windshield header, roof side rails, door beams, and rocker members.

Front crash triggers 140, 142, 144 can be provided on inner and outer sides of the upper portion 110 of the shotgun 100, such that they alternate between the inner side I and outer side O. As can be seen, triggers 140 and 144 of the illustrated exemplary embodiment are located on the outer side O of the upper portion 110 of the shotgun 100, and trigger 142 is spaced between triggers 140, 144 and located on an inner side I of the upper portion 110 of the shotgun 100. The front crash triggers 140, 142, 144 can provide a forward crush zone of the shotgun 100 during a front impact. Although three front crash triggers are shown, it is to be understood that other numbers of indentations can be provided in accordance with desirable crush zone design. In the illustrated embodiment, a first indentation 150 of a Z-trigger on an outer side O of the shotgun and a second indentation 152 of a Z-trigger on an inner side I of the shotgun create a second crush zone of the shotgun 100 during front impact.

In accordance with certain exemplary embodiments of the present teachings, in the event of a vehicle front impact, the forward crush zone created by the front crash triggers 140, 142, 144 provides impact energy absorption by bending before the second crush zone created by the Z-trigger indentations 150, 152. The triggers 140, 142, 144, 150, and 152 provide weakened sections of the shotgun 100 where bending occurs when sufficient force is applied to the shotgun 100. The bending can allow management of the kinetic energy of a crash. Those skilled in the art would understand that the kinetic energy of a crash may deform metal in vehicle crush zones, thereby decreasing kinetic energy available for causing intrusions into a vehicle passenger compartment.

The kinetic energy of the crash is used to bend the shotgun 100 at the triggers 140, 142, 144, 150, and 152 and reduce the kinetic energy available for causing intrusion into the passenger compartment. The triggers are sized to permit the shotgun to bend at the trigger locations during a front end crash. In certain exemplary embodiments of the present teachings, the triggers 140, 142, 144, 150, 152 all have the same depth. In certain exemplary embodiments of the present teachings, the depth of each trigger can be about one fourth to about one third of a width w of the shotgun.

The sequence of crush zone activation can be achieved by weakening the shotgun (preferably with consideration given to IIHS requirements) in a manner that provides the desired sequence. In the illustrated embodiment, such relative weakness is achieved by adjusting the height H and width w of the shotgun 100. As can be seen the shotgun 100 has a height H that tapers from a larger value at a rear end R of the upper portion 110 that connects to the hinge pillar 200 to a smaller value at the central bending portion 130. Less material can make the structure weaker. Thus, even without deformations, the illustrated shotgun 100 weakens as it extends toward the front of the vehicle. In the illustrated embodiment, the width w of the shotgun 100 remains substantially constant from the rear end of the upper portion 110 that connects to the hinge pillar 200 to the bending portion 130, except where triggers are placed.

In the illustrated exemplary embodiment, the width w is varied along the length of the shotgun 100 by providing indentations that are referred to herein as triggers 140, 142, 144, 150, 152. In the illustrated embodiment, trigger 144 has the same depth as other triggers and is located at the smallest height value and thus is the weakest location on the shotgun 100. Trigger 142 is the next weakest location on the shotgun due to its relative height H and width. Trigger 140 is the next weakest location for the same reasons. These three triggers create a forward crush zone that is activated prior to the Z-triggers 150, 152 because the triggers are weaker. Because trigger 152 has a smaller height than trigger 150, trigger 152 is a weaker location than trigger 150 and will therefore bend earlier upon front impact than trigger 152.

In certain exemplary embodiments, an offset distance OD between the last trigger 150 and the hinge pillar end of the shotgun 100 can, for example, be equal to about one and a half times the maximum height of the shotgun or the height of the shotgun where the last trigger 150 is located. The offset distance OD may, however, vary, for example depending on the relative dimensions of the shotgun and the other frame elements and considering other design goals. The spacing between the triggers can also vary based on such considerations as the relative dimensions of the shotgun and the other frame elements and considering other design goals. With the illustrated height H tapering and trigger locations, the exemplary shotgun embodiment of FIGS. 1-4 may provide a desirable sequential bending of triggers and controls bending to direct it in a substantially lateral, rather than downward, direction.

One skilled in the art will understand that there are additional ways to achieve sequential bending for impact energy absorption and direct bending in a substantially lateral direction. For example, smaller triggers could be used when both the height and width of the shotgun taper from the rear end R of the upper portion 110 to the bending portion 130. Also, the width alone could be tapered and the height could remain constant. In addition, the triggers could be formed by beads, darts, holes (for example, one or more holes positioned across the height of the rail), scoring, or another known method of weakening the material of the shotgun at the desired trigger point, for example by lessening the amount of material. Weakening, however, should be achieved in a manner that promotes substantially lateral bending of the shotgun rather than vertical bending, so that pitch is avoided upon front impact.

It should be understood that the overall dimensions of the shotgun and the triggers can vary based on the overall vehicle structure and the composition of the shotgun. As illustrated, the shotgun is connected to the vehicle subframe (not shown) at one end and the hinge pillar 200 at the other end. The hinge pillar 200 is connected to or becomes the A pillar 210 in the area of the vehicle's windshield. At its bottom, the hinge pillar is connected to a side rail including a front rail 220, a mid rail 230, and a rear rail 240. The front rail 220 typically mounts to the vehicle front bumper, for example via bumper bracket 300. An engine mount bracket 310 can be located on a portion of the mid rail 230.

FIG. 4 illustrates a shotgun in accordance with certain exemplary embodiments of the present teachings as deformed after a front impact. As can be seen, the Z-triggers 150, 152 caused bending of the shotgun 100 into a substantially lateral Z-shape. The front crash triggers 140, 142, 144 caused similar substantially lateral bending, here in a W-shape because there are three triggers. As would be understood by one skilled in the art, other portions of the vehicle frame, such as those illustrated in FIGS. 1-3, will also deform upon a front impact and may absorb additional crash energy.

While the present teachings have been disclosed in terms of exemplary embodiments in order to facilitate better understanding of the invention, it should be appreciated that the invention can be embodied in various ways without departing from the scope of the invention. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to a frame element includes two or more frame elements. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A one-piece shotgun for assembly in a frame of a vehicle, the shotgun configured to absorb impact energy when a front of the vehicle is impacted, the shotgun comprising:
an upper portion, a mid portion, and a lower portion, the upper portion having an end configured to connect to a hinge pillar; and
a Z-trigger formed by two indentations and being located adjacent the upper portion end,
wherein the indentations of the Z-trigger are located on an outer side and an inner side of the shotgun to cause substantially lateral bending when sufficient force is applied to the shotgun.

2. The one-piece shotgun of claim 1, wherein the shotgun is hydroformed.

3. The one-piece shotgun of claim 1, wherein the shotgun is attached to a vehicle subframe at an end located in the lower portion of the shotgun.

4. The one-piece shotgun of claim 1, further comprising a second set of triggers in the upper portion of the shotgun.

5. The one-piece shotgun of claim 4, wherein sequential bending of the Z-trigger and the second set of triggers occurs when sufficient force is applied to the shotgun, such that indentations closer to a front of the vehicle cause bending earlier than indentations closer to a rear of the vehicle.

6. The one-piece shotgun of claim 5, wherein indentations closer to the front of the vehicle cause bending earlier than indentations closer to the rear of the vehicle because indentations closer to the front of the vehicle are weaker than indentations closer to the rear of the vehicle.

7. The one-piece shotgun of claim 6, wherein indentations closer to the front of the vehicle are weaker than indentations closer to the rear of the vehicle because a height and a width of the shotgun is greater toward the rear of the vehicle and tapers toward the front of the vehicle.

8. The one-piece shotgun of claim 7, wherein the indentations weaken the shotgun by decreasing a width of the shotgun, each indentation decreasing a width of the shotgun by substantially the same amount.

* * * * *